United States Patent [19]

Negishi et al.

[11] 4,373,839
[45] Feb. 15, 1983

[54] DRILL BIT

[75] Inventors: Hideo Negishi; Kaoru Goto, both of Tokyo; Sueji Takaya, Kawasaki, all of Japan

[73] Assignee: Mitsubishi Kinzoku Kabushiki Kaisha, Tokyo, Japan

[21] Appl. No.: 192,627

[22] Filed: Sep. 30, 1980

[30] Foreign Application Priority Data

| Oct. 2, 1979 | [JP] | Japan | 54-127046 |
| Nov. 15, 1979 | [JP] | Japan | 54-158626[U] |
| Nov. 15, 1979 | [JP] | Japan | 54-158627[U] |
| Nov. 15, 1979 | [JP] | Japan | 54-158628[U] |
| Dec. 29, 1979 | [JP] | Japan | 54-182582[U] |
| Dec. 29, 1979 | [JP] | Japan | 54-182583[U] |
| Feb. 15, 1980 | [JP] | Japan | 55-17567 |
| Jul. 10, 1980 | [JP] | Japan | 55-94389 |
| Aug. 28, 1980 | [JP] | Japan | 55-122286[U] |

[51] Int. Cl.³ .............. B23B 51/00; B23B 51/02; B23B 51/06
[52] U.S. Cl. .............. 408/59; 408/205; 408/223; 408/233
[58] Field of Search .............. 408/204, 205, 206, 207, 408/211, 217, 218, 221, 222, 223, 224, 227, 228, 229, 230, 59

[56] References Cited

U.S. PATENT DOCUMENTS

| 305,625 | 9/1884 | Newey, Jr. | 408/224 |
| 516,277 | 3/1894 | Parks | 408/205 |
| 796,321 | 8/1905 | Granberg | 408/229 |
| 989,379 | 4/1911 | Mather | 408/205 |
| 1,781,863 | 11/1930 | Shoemaker | 408/205 |
| 2,204,030 | 6/1940 | Say | 408/223 |
| 2,358,153 | 9/1944 | Epperson | 408/205 |
| 2,942,501 | 6/1960 | Kallio | 408/206 |
| 3,028,773 | 4/1962 | Borneman | 408/223 |
| 3,452,625 | 7/1969 | Russo | 408/223 |
| 3,572,183 | 3/1971 | Mellone | 408/227 |
| 3,590,671 | 6/1971 | Wahli | 408/228 |
| 4,132,493 | 1/1979 | Hosoi | 408/230 |
| 4,143,723 | 3/1979 | Schmotzer | 408/230 |
| 4,194,862 | 3/1980 | Zweekly | 408/224 |

FOREIGN PATENT DOCUMENTS

| 244711 | 1/1966 | Austria | 408/224 |
| 275443 | 6/1979 | Fed. Rep. of Germany | 408/229 |
| 832238 | 4/1960 | United Kingdom | 408/223 |
| 507449 | 10/1974 | U.S.S.R. | 408/207 |

Primary Examiner—Leonidas Vlachos
Assistant Examiner—Jerry Kearns
Attorney, Agent, or Firm—Cushman, Darby & Cushman

[57] ABSTRACT

A drill bit comprises a body having a shank portion and an end face at its forward end. The drill bit body has at the forward end a cutting means having at least one cutting edge provided on the end face. The cutting edge is spaced from the axis of rotation of the body. The body has a rake surface which terminates in the cutting edge and extends along the axis of rotation.

9 Claims, 79 Drawing Figures

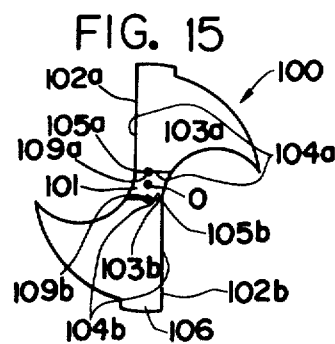
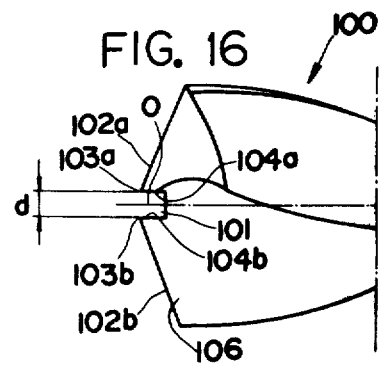
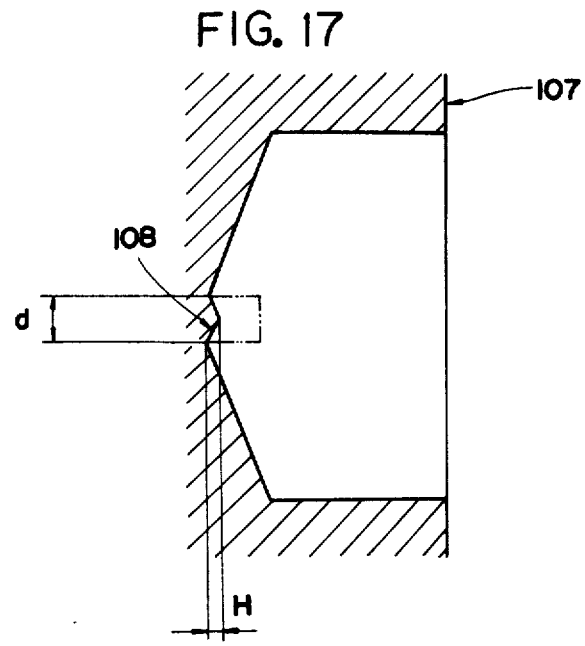
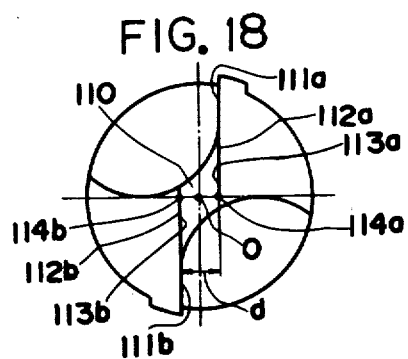
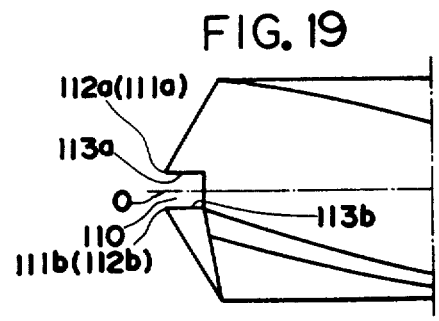

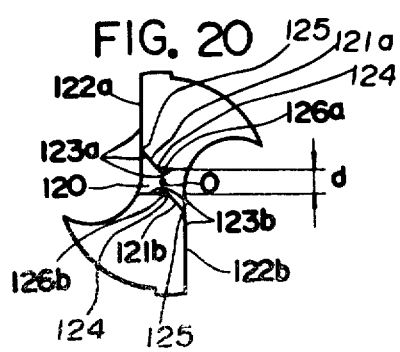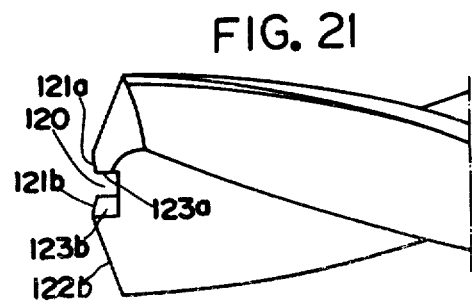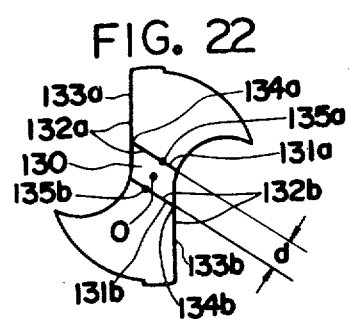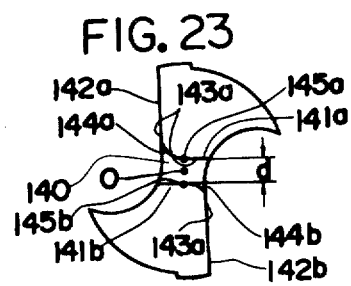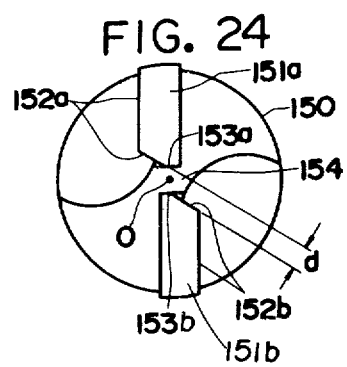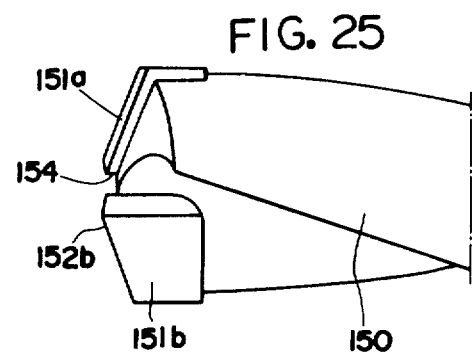

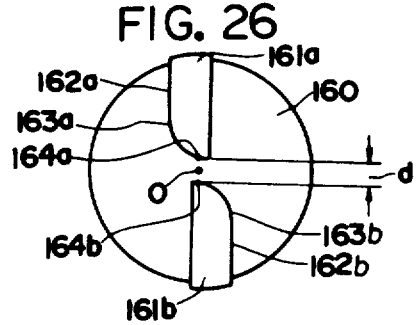
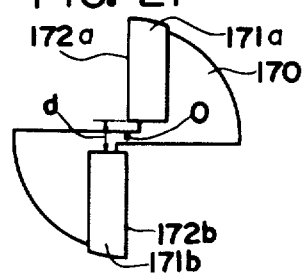
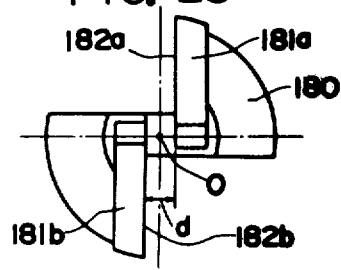
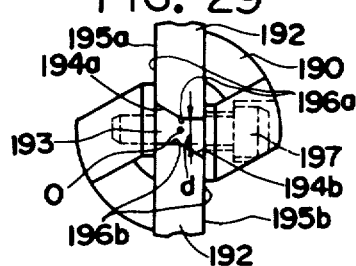
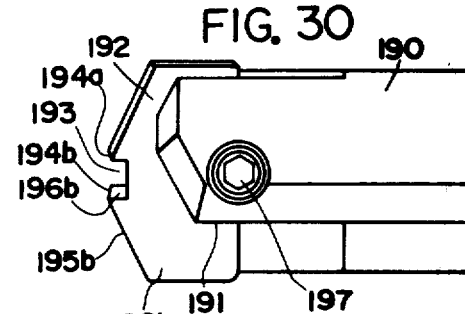
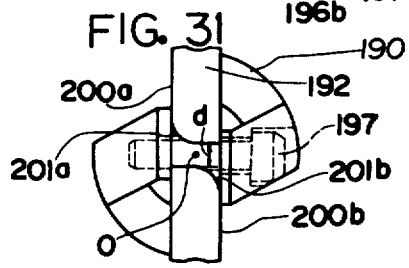

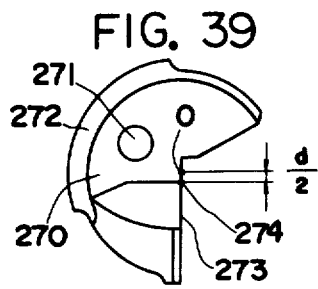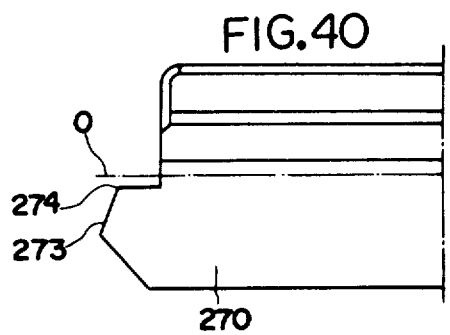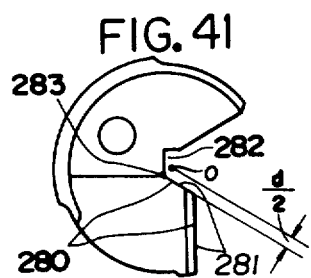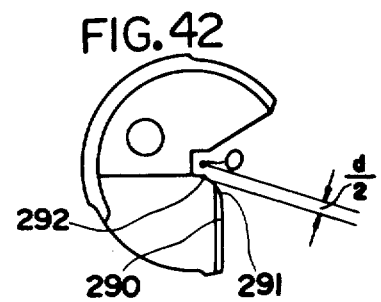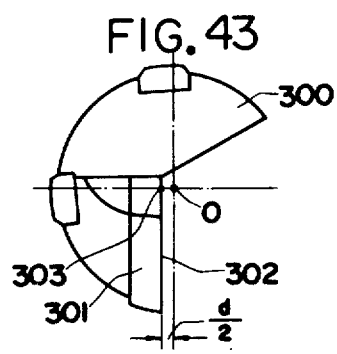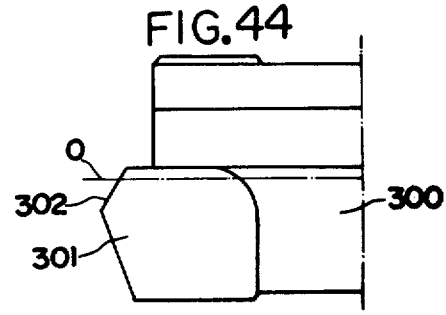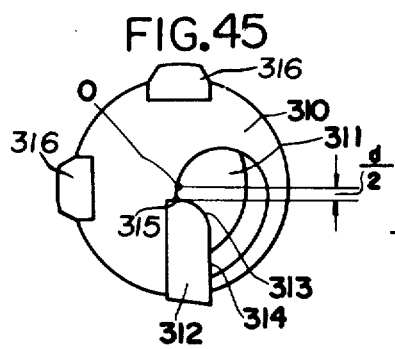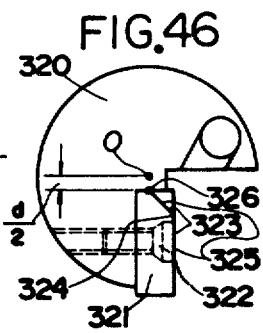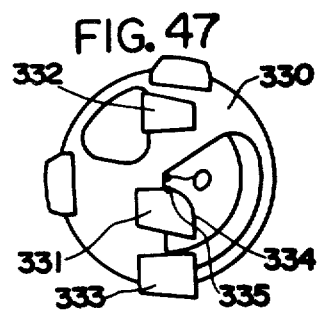

DRILL BIT

BACKGROUND OF THE INVENTION

1. Field of the Invention

The present invention relates to a drill bit. Drilling tools are generally classified into two types, one of them being a trepanning tool for drilling a hole with a core along the axis of rotation, and the other being a drilling tool for drilling a hole without any core. The present invention is concerned with a drilling tool which belongs to the latter type, namely a drilling tool for drilling a hole without any core left. This type of drilling tool is capable of drilling not only a through hole which extends through a workpiece but also a blind hole which has a bottom in a workpiece.

2. Description of the Prior Art

Prior to entering description of the present invention the hitherto known drill bit of the kind will be described.

FIGS. 1 and 2 show a conventional solid type drill bit. A body 1 of the drill bit comprises a shank 2 and a cutting means 3 which is formed integrally on the forward end of the shank 2. This cutting means 3 has two main cutting edges 4a and 4b at its end face. This main cutting edges 4a and 4b are defined respectively by relief surfaces 5a and 5b and rake surfaces 6a and 6b. A chisel cutting edge 8 is also defined by the two relief surfaces 5a and 5b. Marginal sections 7a and 7b are formed on the outer periphery of the forward end. The chisel cutting edge 8 has an angle which is substantially equal to the angle defined by the two main cutting edges 4a, 4b. The chisel cutting edge 8 is a continuation from the main cutting edges 4a and 4b. It is to be noted that the important features of this conventional drill bit are that the chisel cutting edge 8 is provided and that the chisel cutting edge 8 passes through the axis 0 of rotation of the bit body 1.

One drawback of such a conventional drill bit is that an increased thrust load (axial component of cutting resistance) is exerted on the drill bit. As a result, the drill bit is damaged, and the chisel cutting edge is subjected to substantial wear. The reason that the increased thrust load is produced is that the chisel cutting edge 8 extends through the axis 0 of rotation. More specifically, the relief angle of each relief surface need to be sufficiently large that the relief surfaces 5a, 5b do not come into contact with the workpiece when drilling a hole therein. The minimum relief angle is different along the cutting edge, and the closer it approaches to the center of the drill bit, the larger it should be. Theoretically it should have 90 degrees at the center. However, it is impossible to manufacture such a drill bit which has the above-mentioned relief angle. Therefore, in the case of the conventional drill bit in which the cutting edge passes through the axis of rotation, the relief surfaces come into contact with the workpiece within the extent of a certain distance from the center so that the increased thrust load is produced. Another reason that the increased thrust load is produced is that the chisel cutting edge 8 has a negative rake angle. More specifically, the chisel cutting edge 8 has the negative rake angle which is equal to about half of the edge angle $\theta$ of the drill bit. With this construction, the chisel cutting edge is forced into the work piece rather than cuts the same during the drilling operation, so that the chisel cutting edge 8 is subjected to the increased thrust load. This problem of increased thrust load is serious particularly with a drill bit made of a super hard alloy such as cemented carbide, because such a drill bit is liable to be damaged by the thrust load involved.

Another drawback of the above-mentioned conventional drill bit is that melt-adhesion takes place on the chisel cutting edge 8. The melt-adhesion referred to above represents a phenomenon that some cuttings or chips become soft by the heat generated during the cutting operation, and are caused to adhere to the chisel cutting edge 8 by a great cutting pressure involved and then are solidified. Particularly, where a drill bit is made of a super hard alloy, there are occasions when part of the chisel cutting edge 8 or part of the main cutting edges adjacent thereto are forcibly chipped off from the remainder when the adhered cuttings are separated from the chisel cutting edge 8. The problem of melt-adhesion arises from the fact that the drill bit has a considerable negative rake angle and that the cutting is effected at a relatively low speed. Accordingly, as far as the conventional drill bit of the type, in which the chisel cutting edge 8 passes through the axis of rotation, is concerned, it is unavoidable that the melt-adhesion takes place, thereby giving rise to the above-mentioned chipping of part of the chisel cutting edge or part of the main cutting edges adjacent thereto. A further drawback of the conventional drill bit is that it tends to shake during the cutting operation. This shaking of the drill bit arises from the fact that the opposite ends 8a and 8b of the chisel cutting edge 8 alternately serve as a temporary center of rotation. The shaking of the drill bit makes it difficult to drill a straight hole of a circular cross-section. Further, the shaking of the drill bit cause the thrust load and the torque load to fluctuate to such an extent that the cutting operation can not be properly effected and that the drill tip is damaged. Particularly, where a drill bit is made of a super hard alloy, it is quite possible that the drill bit is subjected to damage.

There is known a drill bit which is produced by a thinning method so as to eliminate the above-mentioned drawbacks of the conventional drill bit. A drill bit manufactured by an X type thinning method will be described with reference to FIGS. 3 and 4. This drill bit is formed with another pair of relief surfaces 10a and 10b adjacent to the relief surfaces 5a and 5b. The relief surfaces 5a and 5b and rake surfaces 12a and 12b define thinned cutting edges 11a and 11b, respectively. The rake surfaces 12a and 12b extend along the axis 0 of rotation so that the cutting edges 11a and 11b have a rake angle which is approximately 0° with respect to the axis of rotation. This drill bit is subjected to a thrust load which is less than that of the drill bit as shown in FIGS. 1 and 2 but is still greater than an acceptable thrust load because of the fact that the cutting edges 11a and 11b pass through the axis 0 of rotation. Further, since the cutting edges 11a and 11b pass through the axis 0 of rotation, adverse effects would occur such as the melt-adhesion of cuttings to the edges and the formation of built-up edge. In addition, this type of drill bit has the disadvantage that the cutting edges 11a and 11b have a reduced strength since the forward end portion is thinned by the thinning. As a result, the heavy cutting can not be effected. Further, the total length of the cutting edges 11a and 11b is almost equal to the length of the chisel edge 8 of the drill bit shown in FIGS. 1 and 2, and they pass through the axis 0 of rotation. As a result, the shaking of the drill bit can not be prevented from occuring.

Next, other well known example of a solid type drill bit with two lines of cutting edges will be illustrated and described below.

FIGS. 5 and 6 show a drill bit which is disclosed in Japanese Patent Application Laid-Open No. 51-62475. This drill has at its forward end an oval recess 30 disposed eccentric to the axis 0 of rotation. The chisel cutting edge 31 of the drill bit is interrupted by the oval recess 30. No mention is made in this application of whether or not the chisel cutting edge 31 passes through the axis of rotation, but it appears from the drawings that it passes through the axis of rotation. Since the chisel cutting edge 31 passes through the axis 0 of rotation, it is readily understood that the above-mentioned drawbacks of the conventional drill bit shown in FIGS. 1 and 2 such as the melt-adhesion of cuttings to the chisel cutting edge 31, the formation of a built-up edge and the shaking of the drill bit are not satisfactorily eliminated.

FIGS. 7 and 8 show a drill bit of the brazing type disclosed in Japanese Patent Application Laid-Open No. 54-78587, in which a pair of cutting means 50a, 50b are secured to the forward end of the bit body 1 by brazing. The cutting means 50a and 50b are of the same configuration and are secured to the bit body 1 in such a manner that they are disposed symmetrically with respect to the axis 0 of rotation of the bit body 1. The cutting means 50a and 50b have respective curved cutting edges 51a and 51b each having an arcuate inner portion. The inner end of each of the cutting edges 51a and 51b is located on the axis 0 of rotation of the drill bit body 1.

A drill bit shown in FIGS. 9 and 10 has two cutting means 60a and 60b of different configuration brazed to the forward end of the drill bit body 1. A cutting edge 61a of the cutting means 60a passes through the axis 0 of rotation of the drill bit body 1.

A drill bit shown in FIGS. 11 and 12 has three cutting means 70a, 70b and 70c which are brazed to the forward end of the drill bit body 1. A cutting edge 71b of the central cutting member 70b passes through the axis 0 of rotation of the drill bit body 1.

A common feature of the conventional drill bits shown in FIGS. 7 to 12 is that their cutting edges pass through the axis of rotation. This means that they have the same drawbacks as the above-mentioned other conventional drill bits have.

There is known an insert type drill bit which has cutting means in the form of an insert, the cutting means being detachably secured to the forward end of the drill bit body by fastening means such as screws. Japanese Laid-Open No. 53-15,234 discloses one of such insert type drill bits. Since the cutting edges of the inserts pass through the axis of rotation of the drill bit body, the drill bit has the same drawbacks as the above-mentioned conventional drill bits of the solid type have.

Finally, a typical example of conventional gun drill bits will be described with reference to FIGS. 13 and 14. This gun drill bit has a single cutting edge 80 which passes through the axis 0 of rotation of the drill bit body. Therefore, the gun drill bit has such drawbacks as increased thrust load, the melt-adhesion of cuttings to the cutting edge 80, the formation of a built-up edge, and the chipping of part of the cutting edge from the remainder, as is the case with the above-mentioned solid type drill bits with two cutting edges.

SUMMARY OF THE INVENTION

It is an object of the present invention to provide a drill bit which is subjected to reduced thrust load during the cutting operation and is capable of preventing the melt-adhesion of cuttings to a cutting edge. To accomplish the aforesaid object, the cutting edge or edges are disposed in spaced relation to the axis of rotation of the bit body.

It is another object of the present invention to provide a drill bit which ensures that a core formed on a bottom of a hole being drilled is positively kept to an acceptable short level. To accomplish this object, the drill bit is so constructed that the point of the cutting edge nearest to the axis of rotation of the bit body is spaced by a distance of 0.1 to 1.25 mm. Alternatively, the bit body has at its forward end a core removal means in the form of either a sloping surface or a projection disposed in the vicinity of the axis of rotation.

According to the invention, there is provided a drill bit comprising a body having a shank portion and an end face at its forward end, the body having at the forward end a cutting means having at least one cutting edge provided on the end face, the cutting edge being spaced from the axis of rotation of the body, and the body having a rake surface which terminates in the cutting edge and extends along the axis of rotation.

BRIEF DESCRIPTION OF THE ACCOMPANYING DRAWINGS

FIG. 15 is an end view of a solid type drill with two cutting edges provided in accordance with this invention;

FIG. 16 is a side elevational view of the drill bit of FIG. 15;

FIG. 17 is a cross-sectional view of a hole drilled by the drill bit of FIGS. 15 and 16;

FIG. 18 is an end view of a solid type drill bit of a modified form of the invention;

FIG. 19 is a side elevational view of the drill bit of FIG. 18;

FIG. 20 is an end view of a solid type drill bit in accordance with a modified form of the invention;

FIG. 21 is a side elevational view of the drill bit of FIG. 20;

FIGS. 22 and 23 are end views of solid type drill bits in accordance with modified forms of the invention, respectively;

FIG. 24 is an end view of a brazing type drill bit with two cutting means in accordance with a modified form of the invention;

FIG. 25 is a side elevational view of the drill bit of FIG. 24;

FIGS. 26 to 28 are an end view of a modified brazing type drill bit;

FIG. 29 is an end view of an insert type drill bit with a single insert provided in accordance with a modified form of the invention;

FIG. 30 is a side elevational view of the drill bit of FIG. 29;

FIG. 31 is an end view of a modified insert type drill bit;

FIG. 39 is an end view of a gun drill bit in accordance with a modified form of the invention;

FIG. 40 is a side elevational view of the gun drill bit of FIG. 39;

FIGS. 41 and 42 are end views of modified gun drill bits;

FIG. 43 is an end view of a modified brazing type gun drill bit;

FIG. 44 is a side elevational view of the drill bit of FIG. 43;

FIG. 45 is an end view of a modified BTA tool with a single cutting means;

FIG. 46 is an end view of a modified drill bit with a single insert piece;

FIG. 47 is an end view of a modified BTA tool with three apparent cutting means;

DETAILED DESCRIPTION PREFERRED EMBODIMENTS OF THE INVENTION

Figure 1:
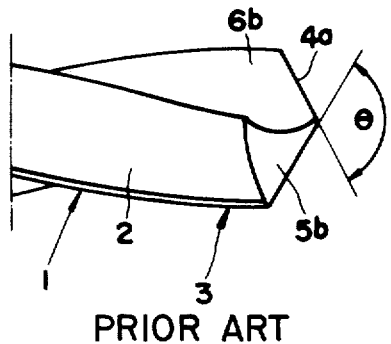
FIG. 1 is a side elevational view of a conventional solid type drill bit with two cutting edges.
Figure 2:
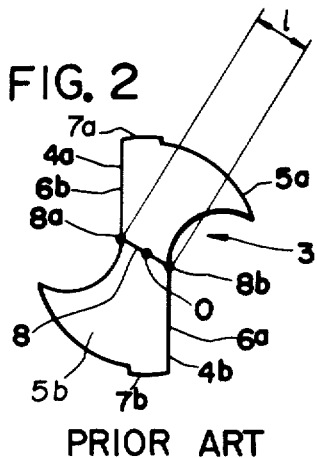
FIG. 2 is an end view of the drill bit of FIG. 1.
Figure 3:
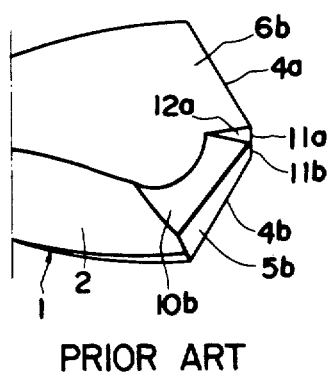
FIG. 3 is a side elevational view of another conventional solid type drill bit with a thinned chisel cutting edge.
Figure 4:
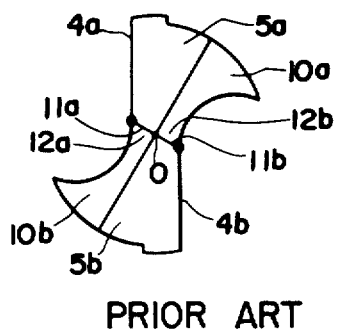
FIG. 4 is an end view of the drill bit of FIG. 3.
Figure 5:
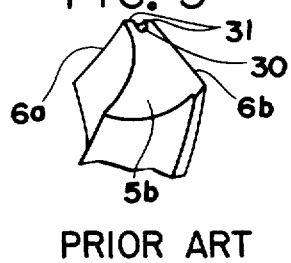
FIG. 5 is a perspective view of a further conventional solid type drill bit with a recess by which a chisel cutting edge is divided into two parts.
Figure 6:
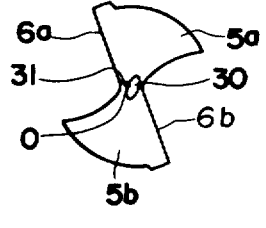
FIG. 6 is an end view of the drill bit of FIG. 5.
Figure 7:
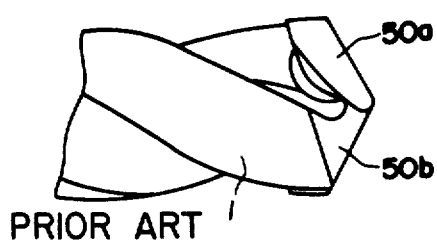
FIG. 7 is a side elevational view of a conventional brazing type drill bit with two symmetrically disposed cutting edges.
Figure 8:
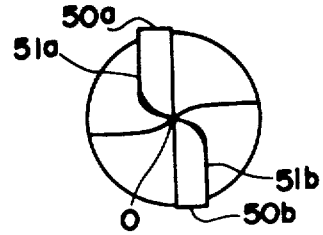
FIG. 8 is an end view of the drill bit of FIG. 7.
Figure 9:
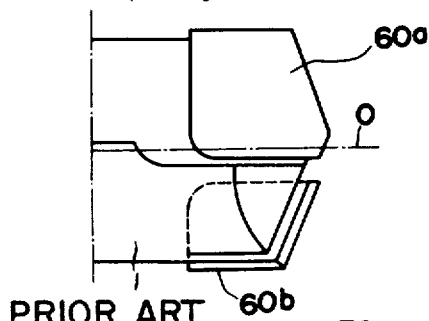
FIG. 9 is a side elevational view of a conventional brazing type drill bit with two asymmetrically disposed cutting edges.
Figure 10:
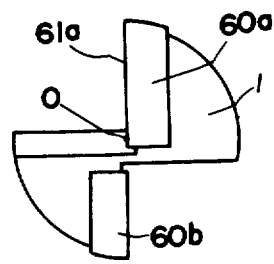
FIG. 10 is an end view of the drill bit of FIG. 9.
Figure 11:
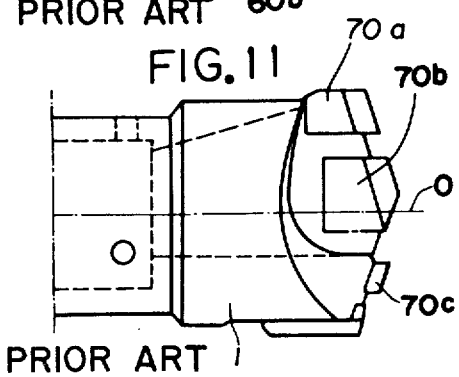
FIG. 11 is a side elevational view of a conventional BTA tool.
Figure 12:
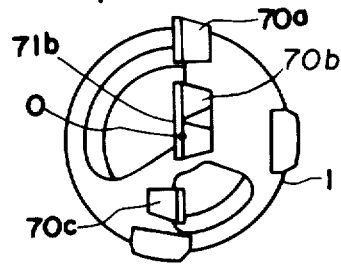
FIG. 12 is an end view of the BTA tool of FIG. 11.
Figure 13:
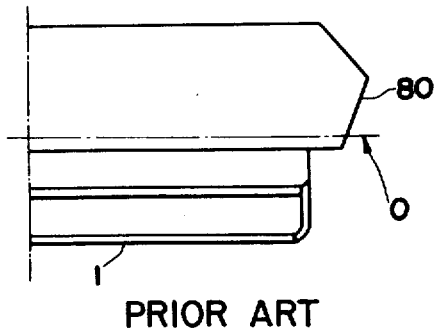
FIG. 13 is a side elevational view of a conventional gun drill.
Figure 14:
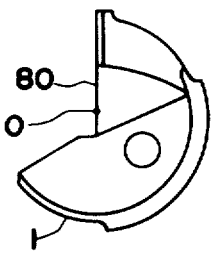
FIG. 14 is an end view of the gun drill of FIG. 13.

The present invention will now be described with reference to the accompanying drawings which illustrate preferred embodiments of the invention.

A solid type drill bit made of either a high speed steel or a super hard alloy such as cemented carbide is shown in FIGS. 15 to 17, the drill bit having two cutting edges. FIGS. 15 and 16 show the forward end of the drill bit body 100. The body 100 has at its forward end an integral cutting means 106. The cutting means has a pair of main cutting edges 102a, 102b. A groove 101 is formed in that portion of the drill end face where the axis O of rotation of the body 100 passes, and the width d of the groove is preferably 0.2 to 2.5 mm. The groove extends radially of the body and perpendicular to the main cutting edges 102a, 102b. As a result of the formation of the groove 101, supplementary cutting edges 103a and 103b are formed along the both sides of the groove 101. The points 109a, 109b of the supplementary cutting edges 103a and 103b nearest to the axis O of rotation are spaced from the axis O of rotation by an equal distance, that is, d/2 (0.1 to 1.25 mm). The supplementary cutting edges 103a and 103b intersect the main cutting edges 102a and 102b at a right angle. The rake surface 104a (104b) extends along the axis O of rotation and terminates at its forward end in the main cutting edge 102a (102b) and supplementary cutting edge 103a (103b). The rake surface 104a (104b) has a corner 105a (105b) at the intersection of the main and supplementary cutting edges, the corner 105a (105b) having an angle of 90 degrees. In this embodiment, the supplementary cutting edges 103a and 103b are disposed symmetrically with respect to the axis O of rotation but this symmetrical arrangement is not necessarily required for the present invention. The axial depth of the groove 101 should preferably be equal to or more than the width d of the groove 101.

The operation of the drill bit so constructed will now be described.

At the beginning of cutting operation the supplementary cutting edges 103a and 103b are brought into cutting engagement with a surface of a workpiece 107 substantially at the same time. As a result, the cutting edges 103a, 103b serve to prevent the drill bit from shaking. Further, the cutting edges 102a, 102b are spaced from the axis O of rotation, and there is provided no chisel cutting edge which passes through the axis of rotation as is the case with the conventional drill bits. With this construction, the cutting operation is smoothly carried out without substantial thrust load exerted on the workpiece when drilling a hole as shown in FIG. 17. Since the supplementary cutting edges 103a and 103b are spaced equidistantly from the axis 0 of rotation, the supplementary cutting edges 103a and 103b rotate around the outer periphery of a conical projection 108 which is created at the center of the bottom of the drilled hole. This advantageously prevents the forward end portion of the bit body from shaking.

Since the groove 101 does not serve to cut the workpiece 107, a cylindrical core (residual part of workpiece) is first created in that portion of the workpiece 107 corresponding to the groove 101. However, the core has such a small diameter (usually on the order of 0.2 to 2.5 mm) that it is easily twisted off by the groove 101 of the rotating drill bit and formed into a conical core 108. This ensures that the cylindrical core is kept to an acceptable short level. As seen from FIG. 17, there is formed no cylindrical core but the conical core 108 of a small height H at the center of the bottom of the drilled hole.

Next, the reason that the core 108 is kept to an acceptable short length will be described with reference to the results of cutting experiments.

Example of Experiments

The experiments were carried out using a cutting oil emulsion. Cast iron (JIS FC 25), mild steel (having a hardness of HB 160) (JIS SS 41), carbon steel (having a hardness of HB 180) (JIS S45C), nickel chrome molybdenum alloy steel (having a hardness of HB 280) (JIS SNCM 8) and stainless steel (JIS SUS 304) were used as workpieces to be drilled. The drill bits had an outer diameter of 20 mm. The width d of the groove 101 was varied in the range of 0.2 to 2.5 mm, feed rate f was in the range of 0.1 to 0.7 mm/rev. The rotational speeds were 740 rpm, 820 rpm and 910 rpm.

As a result of the above described experiments, it was found that as the width d of the groove was increased, the height H of the projection 108 was slightly increased, whereas as the number of revolutions N was increased with the width d of the groove being constant, the height H of the projection 108 was increased. However, when using the drill bits having the grooves 101 of which width d was in the range of 0.2 to 2.5 mm, the projections 108 formed on all the workpieces had a height less than 0.5 mm. In addition, no trace was found that the top of the projection 108 came into contact with the bottom of the groove 101. This indicates that the cylindrical core, grown to a height longer than the acceptable level, was twisted off by the inner walls or rake surfaces of the groove 101 of the rotating drill bit. Thus, the inner walls of the groove 101 serve as a core removal means.

Hence it was concluded from the results of the experiments that it is possible to carry out the drilling operation with the residual core being kept to a certain allowable length, as far as the width d of the groove 101 is in the range of 0.2 to 2.5 mm, even though no cutting edge is provided at the axis of rotation of the bit body. In other words, if the point of the cutting edge nearest to the axis of rotation is spaced by a distance of 0.1 to 1.25 mm from the axis of rotation, the drilling operation is carried out satisfactorily.

In this connection, drill bits without any cutting edge at the axis of rotation have heretofore been put in use such as a core drill and a trepanning tool, the core drill being employed for enlarging a pre-drilled hole, while the trepanning tool is used to bore a hole with a core left to carry out a trepanning operation. It is clear that they are quite different from the drill bits in accordance with the present invention in structure and function.

FIGS. 18 and 19 illustrate a modified solid type drill bit in accordance with the invention. In this embodiment, the drill bit has a groove 110 which extends in parallel to the main cutting edges 111a, and 111b. Thus, the supplementary cutting edges 112a and 112b are disposed in alignment of the main cutting edges 111a and 111b whereby the raking surfaces 113a and 113b are formed flat. The points 114a, 114b of the cutting edges 112a, 112b nearest to the axis O of rotation are spaced from the axis by a distance of d/2, that is, 0.1 to 1.25 mm.

FIGS. 20 and 21 illustrate a modified solid type drill bit. In this embodiment, the drill bit has a groove 120 which has supplementary cutting edges 121a and 121b on the opposite sides thereof. Each of supplementary cutting edges 121a and 121b is formed by two straight lines which intersect each other, the intersection having an angle more than 90 degrees, for instance, 135 degrees, one of the two lines intersects the main cutting edge 122a or 122b, the intersection having an angle more than 90 degrees, for instance, 135 degrees. The points 126a, 126b of the cutting edges 121a, 121b nearest to the axis O of rotation are spaced from the axis by a distance of d/2, that is, 0.1-1.25 mm. Thus the rake surface 123a (123b), which terminates in the main cutting edge 122a (122b) and supplementary cutting edge 121a (121b), has a corner section 124 (125), the corner sections having an angle more than 90 degrees. Since the rake surfaces have the respective corner sections 124 and 125 which have an angle more than 90 degrees, the following additional advantages are obtained. More specifically, cuttings are caused to slide on the corner sections 124, 125 and are smoothly discharged from the drilled hole, so that the supplementary cutting edges 121a, 121b are not subjected to damage and undue wear. In addition, the melt ahesion of cuttings to the edges 121a, 121and the chipping of the edges are prevented.

FIGS. 22 and 23 show modified solid type drill bits, respectively which are designed and constructed in accordance with the same technical concepts as those in FIGS. 20 and 21. The drill bit as illustrated in FIG. 22 has a groove 130 which has supplementary cutting edges 131a and 131b on the opposite side thereof. The straight supplementary cutting edges 131a and 131b intersect the main cutting edges 133a and 133b, respectively, the intersection having an angle more than 90 degrees. The rake surface 132a (132b) terminating in the main cutting edges 133a (133b) and supplementary cutting edge 131a (131b) has a corner section 134a (134b) which has an angle more than 90 degrees. The points 135a, 135b of the supplementary cutting edges 131a, 131b nearest to the axis O of rotation are spaced from the axis of rotation by a distance of d/2, that is, 0.1 to 1.25 mm. The drill bit as illustrated in FIG. 23 also has a groove 140 which has supplementary cutting edges 141a and 141b on the both sides thereof, wherein the supplementary cutting sections 141a and 141b have respective arcuate portions adjacent to the main cutting edges 142a and 142b. The points 145a, 145b of the cutting edges 141a, 141b nearest to the axis O of rotation are spaced from the axis of rotation by a distance d/2, that is, 0.1 to 1.25 mm. The rake surface 142a (142b) terminating in the main cutting edge 143a (143b) and supplementary cutting edge 141a (141b) has a corner section 144a (144b) which is a part of a cylindrical surface. The whole rake surface may be in the form of an arcuate convex surface.

The design and structure of the drill bit shown in FIGS. 20 to 23 are also applicable to a brazing type drill bit and an insert type drill bit (gun drill bit, BTA tool, split type drill bit, etc.). Examples of these drill bits will be described hereinafter.

A brazing type drill bit in accordance with the present invention will be described with reference to FIGS. 24 and 25. The drill bit comprises a body 150 which has two pieces of cutting means 151a and 151b brazed to the tip end thereof. These cutting pieces may be made of cemented carbide, and all of the drill bits either of the brazing type or the insert type may also be made of cemented carbide. The cutting means 151a and 151b are spaced by an equal distance from the axis O of rotation and symmetrically disposed relative to the axis O of rotation. Preferably, the distance d/2 between the axis O of rotation and the points 153a, 153b of the cutting edges 152a and 152b of the cutting means 151a and 151b nearest to the axis O of rotation is on the order of 0.1 to 1.25 mm. Since the cutting edges 152a and 152b don't pass through the axis O of rotation, the drill bit is subjected to reduced thrust load. In addition, the melt-adhesion of cuttings to the cutting edges 152a and 152b and the chipping of the cutting edges are prevented. In this embodiment, a groove 154 is defined by the cutting means 151a and 151b brazed to the body 150. Thus, this drill bit is very similar in construction to the abovementioned solid type drill bit of the invention (as illustrated, for instance, in FIG. 20). Accordingly, the features and advantages obtained by this type of drill bit are substantially the same to those of the drill bit as illustrated in FIG. 20.

The drill bit as illustrated in FIG. 26 comprises a body 160 which has two cutting means 161a and 161b brazed to the tip end thereof. The cutting means 161a and 161b are disposed symmetrically with respect to the axis O of rotation, and the points 164a and 164b of the cutting edges 162a and 162b nearest to the axis O of rotation is spaced by a distance of d/2 from the axis O of rotation. This drill bit is different from that shown in FIGS. 24 and 25 in respect of the shape of the cutting edges 162a and 162b and the rake surfaces 163a and 163b. The shapes of the cutting edges 162a and 162b and rake surfaces 163a and 163b are similar to those of the drill as illustrated in FIG. 23. The cutting edges and rake surfaces of this brazing type drill bit may be similar to those of the drill bits as illustrated in FIGS. 15, 18 and 22.

FIGS. 27 and 28 illustrate a modified brazing type drill bit. The drill bit as illustrated in FIG. 27 comprises a body 170 which has two cutting means 171a and 171b brazed to its tip end. This drill bit is so constructed that the both cutting edges 172a and 172b are located in alignment with each other, and their extension lines pass through the axis O of rotation. The drill bit is illustrated in FIG. 28 comprises a body 180 which has two cutting means 181a and 181b brazed to its tip end and arranged in parallel to each other. More specifically, the cutting means 181a and 181b have cutting edges 182a and 182b which are located in parallel with each other and spaced from each other by the distance d. Further the cutting edges 182a and 182b are arranged such that the axis O of rotation is located centrally of them.

FIGS. 29 and 30 illustrate a spade drill bit of the insert type which has two cutting edges. The spade drill bit comprises a body 190 which has a slit 191 in its tip end in which a cutting insert 192 is inserted. The insert 192 is fixedly secured to the drill bit body 190 at its split tip end by means of clamping means such as a bolt or the like. The insert 192 has a groove 193 at its extended tip end, which has a width d. The opposite sides or edges of groove 193 define supplementary cutting edges 194a and 194b which are spaced from the axis O of rotation. The supplementary cutting edges 194a and 194b intersect the main cutting edges 195a and 195b, respectively. The rake surface 196a (196b) terminates in the main cutting edges 195a (195b) and supplementary cutting edges 194a (194b) has a shape similar to those of the solid type drill as illustrated in FIG. 20. The technical advantages achieved by this drill bit are substantially the same as those of the drill bit as illustrated in FIG. 20.

FIG. 31 illustrates a modified spade drill. This spade drill has cutting edges 200a and 200b and rake surfaces 201a and 201b which have a configuration similar to that of the drill bit as illustrated in FIG. 23. The cutting edges and rake surface of this spade drill may have a configuration similar to that of the drill bit as illustrated in FIGS. 15 and 22.

A modified insert type drill bit with two cutting inserts will now be described with reference to FIGS. 32 to 37.

Figure 32:
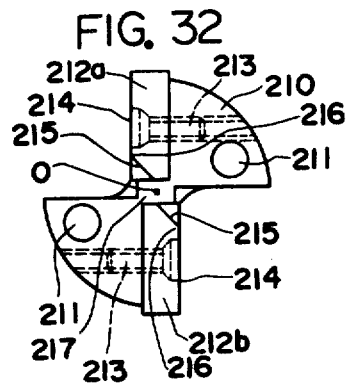
FIG. 32 is an end view of a modified insert type drill bit with two insert pieces.
Figure 33:
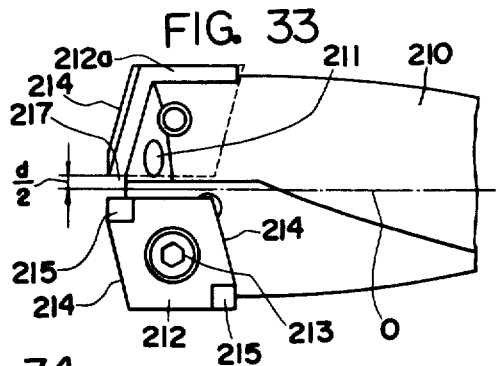
FIG. 33 is a side elevational view of the drill bit of FIG. 32.

First, an insert type drill bit as illustrated in FIGS. 32 and 33 will be described. The drill bit body 210 has lubricant supply holes 211 which extend along the axis O of rotation. At the forward end of the body 210 are provided two inserts 212a and 212b which have the same configuration, the inserts 212a and 212b being fixedly secured to the body 210 by means of clamping means 213 such as a bolt or the like. These inserts 212a and 212b are parallelogam-shaped, each insert having two cutting edges 214, 214 at the opposite sides thereof. Further each insert, has two recesses 215, 215 at their opposite corners, the forward edge of each recess 215 intersecting the cutting edge 214, and the intersection having an angle more than 90 degrees. The forward edge constitutes a cutting edge. Thus the rake surface terminating in the cutting edges 214 and 215 has a corner section 216 having an angle more than 90 degrees. When one of the two cutting edges 214 of the insert 212a (212b) is worn, it is replaced with another cutting edge by loosening the bolt 213 and then rotating the insert by 180 degrees, so that drilling operation is carried out with this replaced cutting edge. If the both cutting edges 214 become worn, the whole insert should be replaced by a new one. The inserts 212a and 212b are disposed symmetrically with respect to the axis O of rotation. The inserts 212a and 212b are spaced by a distance of d/2 from the axis O of rotation. In other words, the distance between the axis O of rotation and the point of the cutting edge 214 nearest to the axis O of rotation is d/2. Since the inserts 212a and 212b are spaced from each other, the inserts define therebetween a groove 217 having a width d. This insert type drill bit has a configuration similar to that of the aforesaid drill bits in accordance with the present invention, particularly those as illustrated in FIGS. 20 and 26, and therefore has substantially the same advantages as those of the latter.

Figure 34:
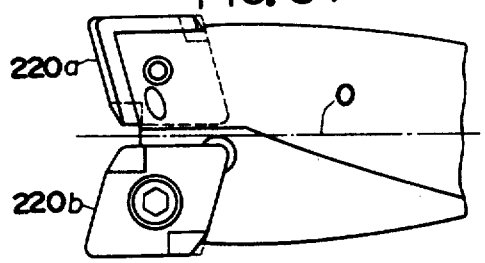
FIG. 34 is a side view of a modified insert type drill bit.

A modified drill bit as illustrated in FIG. 34 has a structure similar to that of the drill bit as illustrated in FIGS. 32 and 33. A difference is that the cutting edges 220a and 220b are sloping radially inwardly.

Figure 35:
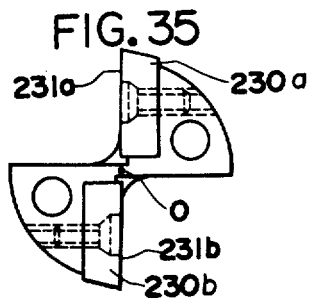
FIGS. 35 to 38 are end views of modified insert type drill bits.

A modified drill bit as illustrated in FIG. 35 has cutting inserts 230a and 230b. The cutting edges 231a and 231b being located in alignment, and their extension lines passing through the axis O of rotation. The cutting edges 231a and 231b are formed and arranged substantially in the same manner as those of the drill bit as illustrated in FIG. 27.

Figure 36:
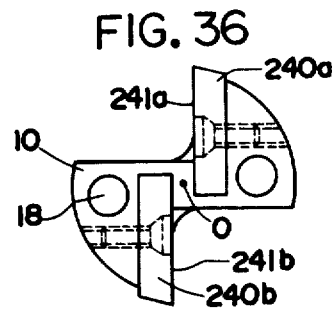

A modified drill bit as illustrated in FIG. 36 has inserts 240a and 240b which are spaced in parallel to each other. Thus their cutting edges 241a and 241b extend in parallel to each other and are spaced by a distance of d/2 from the axis O of rotation. The cutting edges of this drill bit are formed and arranged substantially in the same manner as those of the drill bit as illustrated in FIG. 28.

Figure 37:
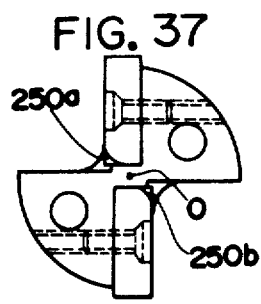

A modified drill bit as illustrated in FIG. 37 has cutting edges 250a and 250b which are formed and arranged substantially in the same manner as those of the drill bit as illustrated in FIGS. 23 and 26.

Figure 38:
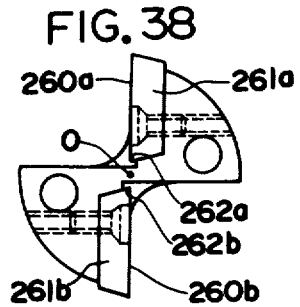

A modified drill bit as illustrated in FIG. 38 has a structure similar to that of the drill bit as illustrated in FIG. 35. A difference is that the corner section 262a and 262b of the inserts 261a, 261b, in which the cutting edges 260a and 260b terminate, have an angle less than 90 degrees.

All of the above described drill bits have the two symmetrically disposed cutting edges. This symmetrical arrangement prevents the drill bit from shaking during the drilling operation. The two cutting edges may be arranged asymmetrically.

Next, drill bits with a single cutting edge in accordance with the present invention will be described. Common features of these drill bits are that the cutting edge is spaced from the axis of rotation and that the distance d/2 between the axis of rotation and the point of the cutting edge nearest to said axis of rotation is in the range of 0.1 to 1.25 mm. By virtue of the former feature, the drill bit is subjected to reduced thrust load, and the melt adhesion of cuttings to the cutting edge is prevented. By virtue of the latter feature, the diameter of a core formed on the bottom of a drilled hole in a workpiece is limited to the range of 0.2 to 2.5 mm, so that the core is kept to an acceptable short level.

FIGS. 39 and 40 illustrate a typical gun drill bit. This gun drill bit is of the solid type with a single cutting edge. The bit body 270 has a lubricant supply hole 271 which extends along the axis O of rotation. The body has a guide pad 272 at its outer periphery and a cutting edge 273 at its forward end face. The cutting edge 273 is so arranged that its extension line passes through the axis O of rotation, while the inner end 274 of the cutting edge 273 close to the axis O of rotation is spaced therefrom by a distance of d/2.

A modified gun drill bit as illustrated in FIG. 41 has a cutting edge 280 having two straight portions and the raking surface 281 terminating in the cutting edge 280 has a corner section 282 which has an angle more than 90 degrees. The point 283 of the cutting edge 280 nearest to the axis O of rotation is spaced by a distance d/2 from the axis O of rotation.

A modified gun drill bit as illustrated in FIG. 42 has a cutting edge 290 which has an inner arcuate portion adjacent to the axis O of rotation. Accordingly, a part of the rake surface 291 terminating in the cutting edge 290 is correspondingly formed to an arcuate surface. The point 292 of the cutting edge 290 nearest to the axis O of rotation is spaced by a distance of d/2 from the axis.

FIGS. 43 and 44 illustrate a brazing type drill bit with a single cutting edge. This drill bit comprises a body 300 which has a single cutting means 301 brazed to the body 300 at its forward end. The cutting means 301 has a cutting edge 302 which is straight when viewed from the forward end of the body. The point 303 of the cutting edge 302 nearest to the axis O of rotation is spaced by a distance of d/2 from the axis of rotation.

FIG. 45 illustrates a BTA tool with a single cutting edge. The body 310 of the tool has a cavity 311 for discharging cuttings, the cavity extending along the axis O of rotation. The body has guide pads 316 fixedly secured to its outer periphery, and a cutting means 312 brazed to its forward end. The cutting means 312 has a rake surface 313 having an inner arcuate portion. The rake surface terminates in a cutting edge 314, and the point 315 of the cutting edge 314 nearest the axis O of rotation is spaced by a distance of d/2 from the axis O of rotation.

FIG. 46 illustrates an insert type drill bit with a single cutting edge. The body 320 of the drill bit has a single insert 321 at its foreward end, which is fixedly secured thereto by means of a suitable clamping means 322 such as a bolt or the like. The rake surface 323 of the insert 321 has a corner section 324 which has an angle more than 90 degrees. The rake surface 323 terminates in a cutting edge 325, and the point 326 of the cutting edge 325 nearest to the axis O of rotation is spaced by a distance of d/2 from the axis of rotation.

FIG. 47 illustrates a typical cutting edge split type drill bit. The drill bit comprises a body 330 which has three cutting means 331, 332 and 333 brazed to the forward end of the body 330. The cutting means 331, 332 and 333 are diametrically spaced. The characteristic feature of the present invention is achieved by the arrangement of the cutting means 331 which is located nearest to the axis O of rotation. More specifically, the cutting edge 334 of the cutting means 331 is spaced from the axis O of rotation, and further more specifically the point 335 of the cutting edge 334 nearest to the axis O of rotation is spaced by a distance of d/2 (0.1 to 1.25 mm) from the axis of rotation.

A drill bit having means adjusting the bit diameter in accordance with the present invention will be described with reference to FIGS. 48 to 53. The first feature of this drill bit is that the cutting edges are spaced from the axis of rotation of the body. The second feature is that the bit body has a deep slit at its forward end, the slit extending along and passing through the axis of rotation. The bit body is divided into two sections by the slit so that the radial distance between the two sections can be adjusted by means of a suitable adjusting means such as a threaded element so as to adjust the diameter of the drill bit. With this construction, a single drill bit can drill holes of different diameters. By virtue of the first feature, the drill bit is subjected to reduced thrust load, and the melt adhesion of cuttings to the cutting edge and the chipping of the cutting edge are prevented. Further, since the distance between the cutting edge and the axis of rotation can be adjusted to the range of 0.1 to 1.25 mm by means of the aforesaid adjusting means, a core formed on the bottom of a drilled hole is kept to an acceptable short level.

Figure 48:
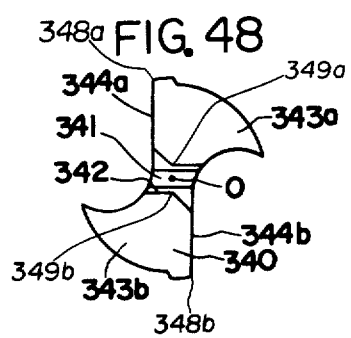
FIG. 48 is an end view of a modified solid type drill bit.
Figure 49:
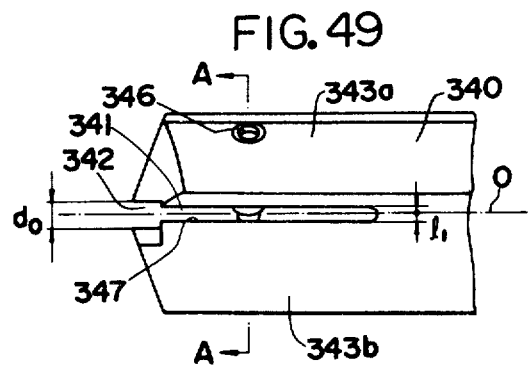
FIG. 49 is a side elevational view of the drill bit of FIG. 48.
Figure 50:
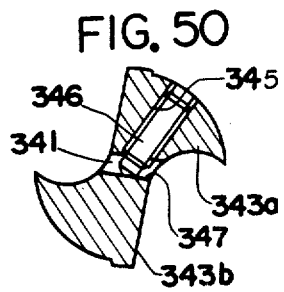
FIG. 50 is a cross sectional view of the drill bit taken along the line A—A of FIG. 49.

FIGS. 48 to 50 illustrate a solid type drill bit with two cutting edges. This drill bit has a structure similar to that of the drill bit as illustrated in FIG. 20. Now differences of this drill bit from that in FIG. 20 will be described below.

The drill bit comprises a body 340 having a deep slit 341 at the forward end part thereof, the slit 341 extending along and passing through the axis of rotation. The slit 341 has a predetermined width 11 and is enlarged to provide a groove 342 at its forward end portion. The groove 342 has a width dO which is greater than the width 11 of the slit 341. This makes it easy to carry out machining for the slit 341. The width 11 of the slit 341 may be equal to the width dO of the groove 342. In this case, the both slit 341 and groove 342 are formed by machining operation at the same time. The depth of the slit 341 is determined in such a manner that the two sections 343a and 343b divided by the slit 341 are resiliently deformed within a certain extent. The two split sections 343a and 343b has respective cutting edges 344a and 344b at their end faces. One split section 343a has a threaded hole 345 in which a screw 346 is screwed to serve as an adjustable member. The screw 346 extends into the slit 341 and is in contact with the inner wall 347 of the other split section 343b. By further rotating and screwing the screw 346, the forward end of the screw 346 pushes the split section 343b so that the split section 343a is subjected to the repulsive force caused by the other split section 343b. This causes the both split sections 343a and 343b to be resiliently deformed in the opposite directions to the same extent. As a result, the points 348a and 348b of the cutting edges 344a and 344b remote from the axis O of rotation are brought further far away from the axis O of rotation by the same distance in the radial direction. This means that the drill bit has had an enlarged diameter. Next, by rotating the screw 346 in the reverse direction to displace the same radially outwardly, the two split parts 343a and 343b are subjected to less resilient deformation. As a result, the outermost end points 348a and 348b move toward the axis O of rotation. This means that the drill bit has had a reduced diameter. Thus, the diameter of this drill bit can be adjusted by means of the screw member 346. In this connection, the distance between the axis O of rotation and the points 349a and 349b of the cutting edges 344a and 344b nearest to the axis O of rotation is adjusted within the range of 0.1 to 1.25 mm.

Figure 51:
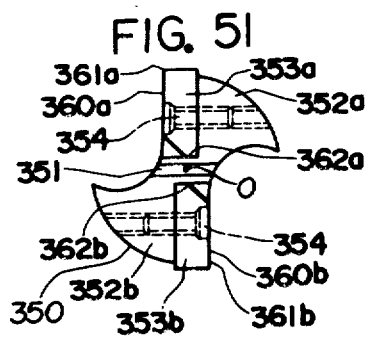
FIG. 51 is an end view of a modified insert type drill bit.
Figure 52:
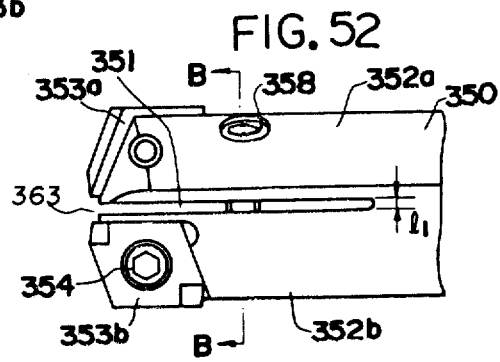
FIG. 52 is a side elevational view of the drill bit of FIG. 51.
Figure 53:
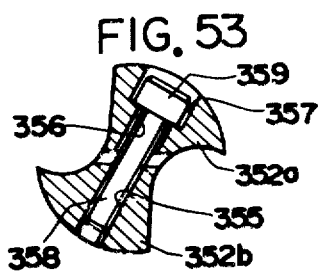
FIG. 53 is a cross sectional view of the drill bit taken along the line B—B of FIG. 52.

FIGS. 51 to 53 illustrate a brazing type drill bit with two cutting edges. This drill bit has a structure similar to that of the drill bit as illustrated in FIGS. 32 and 33. The drill bit comprises a body 350 which has a deep slit 351 at its forward end, the slit 351 extending along and passing through the axis O of rotation. The split sections 352a and 352b divided by the slit 351 have inserts 353a and 353b fixedly secured to their forward ends by bolts 354. The inserts 353a and 353b define therebetween a groove 363 which is in communication with the slit 351. One split section 352b has a threaded hole 355, whereas the other split section 352a has a through hole 356 and a recess 357 extending therefrom. A screw member 358 is screwed in the threaded hole 355 through the drilled hole 356. The head portion 359 of the screw member 358 is received in the recess 357. In this embodiment, the split sections 352a and 352b are resiliently deformed by further screwing the screw member 358 so that they approach one another. As a result, the outermost ends 361a and 361b of the cutting edges 360a and 360b of the inserts 353a and 353b are moved toward the axis O of rotation by an equal distance in the radial direction. This means that the drill bit has had a reduced diameter. Next, when rotating the screw member 358 in the reverse direction, the split sections 352a and 352b are subjected to less resilient deformation and moved away from each other. As a result, the outermost ends 361a and 361b of the cutting edges 360a and 360b are moved away from the axis O of rotation in the radial direction. This means that the drill bit has had an enlarged diameter. The distance between the axis O of rotation and the points 362a and 362b of the cutting edges 360a and 360b nearest to the axis of rotation is adjusted to the range of 0.1 to 1.25 mm.

The advantageous features as described above with reference to FIGS. 48 to 53 may be applicable to other types of drill bits such as drill bits with two cutting edges asymmetrically disposed, drill bits with a single cutting edge and drill bits with more than three cutting edges.

FIGS. 54 to 59 illustrate drill bits which has additional features as described below. One of such features is that a lubricant hole is opened at the center of the forward end face, the lubricant hole passing through the axis of rotation. The main feature of the present invention is that the cutting edge or edges are spaced from the axis of rotation. The embodiments of the present invention as described below are characterized in that the area including the axis of rotation, that is, the area where no cutting edge is present is effectively utilized as an opened section to which the lubricant hole is opening. The conventional drill bit with a lubricant hole formed therethrough is of such a construction that the lubricant hole is opening to the relief surface at the forward end face of the drill bit body. However, with this construction, a very narrow clearance is provided between the relief surface and the bottom of a hole being drilled, and therefore only a small quantity of lubricant was fed through the lubricant hole. Thus, an adequate amount of cutting oil has failed to reach the cuttings produced from the workpiece. The drill bits in the following embodiments are designed to overcome these drawbacks of the prior art drill bits.

Figure 54:
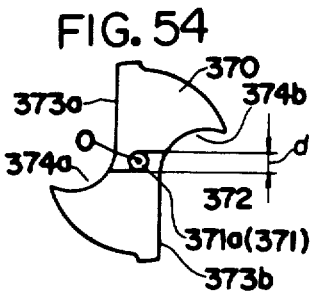
FIG. 54 is an end view of a modified solid type drill bit with a lubricant passageway therethrough.
Figure 55:
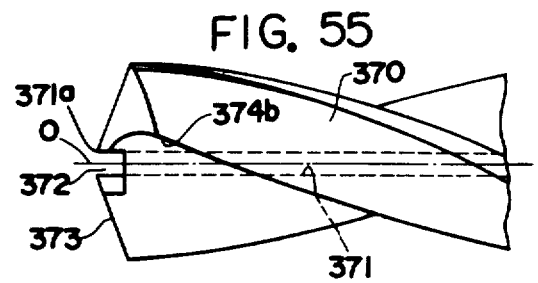
FIG. 55 is a side elevational view of the drill bit of FIG. 54.

FIGS. 54 and 55 illustrate a solid type drill in accordance with the invention. This drill has a structure similar to that as illustrated in FIG. 20 but is different from the same in the following respects. The body 370 of the drill bit has a lubricant hole 371 which extends along and passing through the axis O of rotation. The opening 371a of the lubricant hole 371 at the forward end face of the drill bit body 371 is located at the center thereof, that is, in the area containing the axis O of rotation. The opening 371a has a diameter which is almost the same to the width d of the groove 372 but may be smaller or larger than the same. The cutting edges 373a and 373b are shaped and arranged substantially in the same manner as those of the drill bit as illustrated in FIG. 20. The above-described structure of the drill bit brings about the following additional advantages. Lubricant or cutting oil supplied through the lubricant hole 370 flows from the forward central portion of the drill bit body 370 through the groove 372 toward the flutes 374a and 374b. This causes a large quantity of lubricant to be smoothly supplied to the forward end of the drill bit to give sufficient cooling and lubricating effect to the same, thereby prolonging a service life of the drill bit and improving machining accuracy of drilled hole. Further, since the lubricant reaches directly the cutting edges 373a and 373b, lubrication and cooling for the cutting edges 373a and 373b are carried out in an effective manner. In addition, produced cuttings at the central part of the bottom of the drilled hole are smoothly discharged through the groove 372 to the flutes 374a and 374b together with the lubricant supplied. Further, since the single lubricant hole 371 extends straightly along the axis O of rotation, it is very easy to have the lubricant hole 371 drilled.

Figure 56:
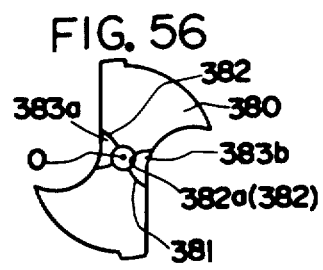
FIGS. 56 and 58 are end views of modified solid type drill bits.
Figure 57:
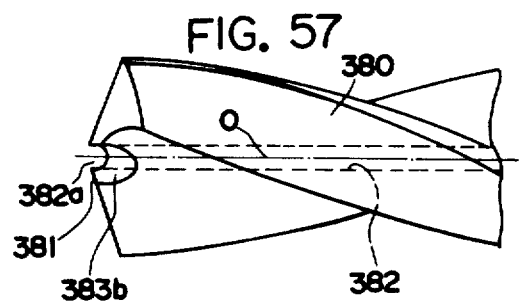
FIGS. 57 and 59 are side elevational views of the drill bits of FIGS. 56 and 58, respectively.

FIGS. 56 and 57 illustrate a drill bit with thinned supplemental cutting edges 381. This edge 381 is divided into two sections by a lubricant hole 382 opening to the central portion of the forward end face of the drill bit body 380. In this embodiment, radially extending grooves are defined by an opening 382a of the lubricant hole 382 and recesses 383a and 383b formed by thinning operation.

Figure 58:
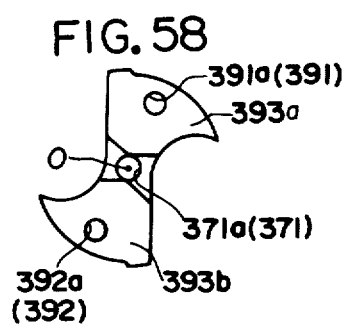
Figure 59:
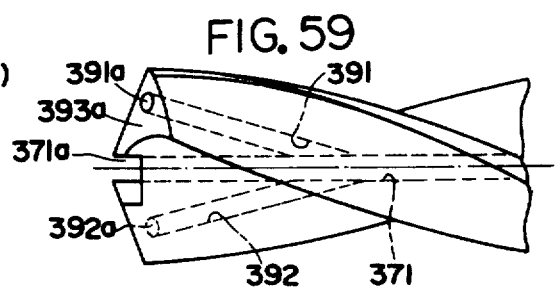

FIGS. 58 and 59 illustrate a drill bit similar to that as illustrated in FIGS. 54 and 55. A difference of this drill bit is that two additional lubricant holes 391 and 392 are provided. The additional lubricant holes 391 and 392 are in communication with a main lubricant hole 371 at positions spaced a predetermined distance from the forward end face of the drill bit body 370, the lubricant hole 371 extending along the axis O of rotation. Openings 391a and 391b of the lubricant holes 391 and 392 are formed in relief surfaces 393a and 393b at the forward end of the drill bit body 370.

All of the above described three embodiments of the present invention are concerned with solid type drill bits with two cutting edges, but the advantageous features of these embodiments may be applicable to other type of drill bits such as drill bits with a single cutting edge, brazing type drill bits with more than three cutting edges and insert type drill bits.

Figure 60:
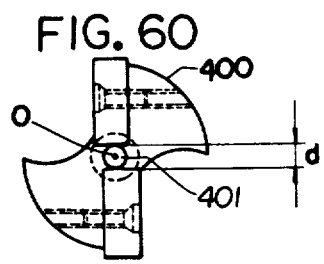
FIG. 60 is an end view of a modified insert type drill bit with a coolant hole.
Figure 61:
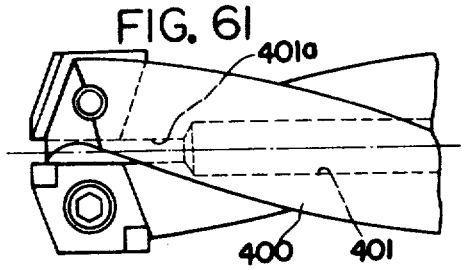
FIG. 61 is a side elevational view of the drill bit of FIG. 60.
Figure 62:
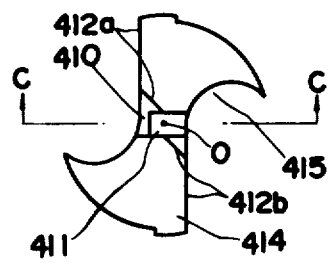
FIG. 62 is an end view of a modified solid type drill bit with a core removal means in the form of a sloping surface.
Figure 63:
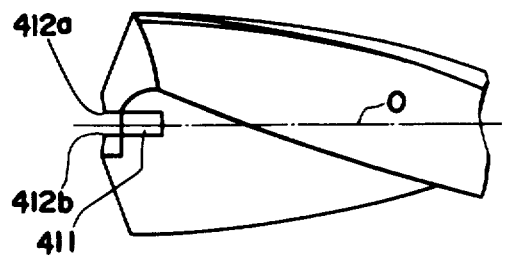
FIG. 63 is a side elevational view of the drill bit of FIG. 62.
Figure 64:
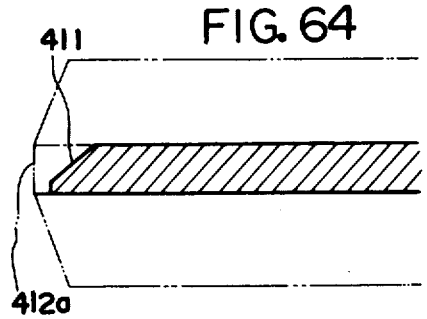
FIG. 64 is a sectional view of the drill bit taken along the line C—C of FIG. 62.
Figure 65:
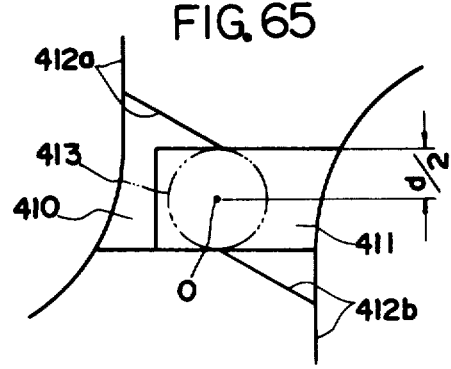
FIG. 65 is an enlarged end view of the drill bit of FIG. 62.
Figure 66:
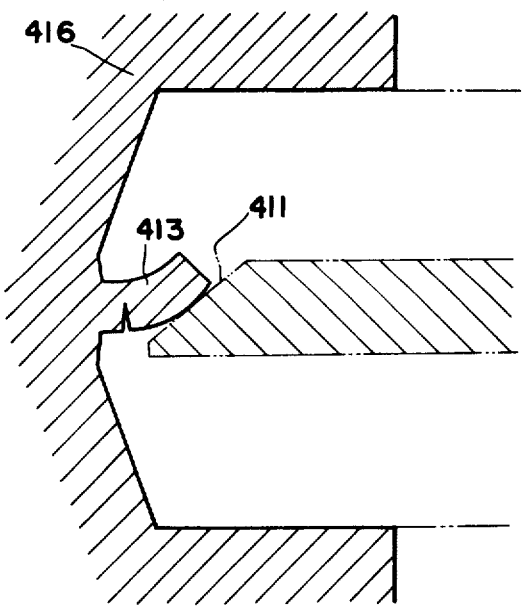
FIG. 66 is a cross-sectional view of a hole drilled by the drill bit of FIGS. 62 to 65.

One example of brazing type drill bits will be described with reference to FIGS. 60 and 61. The cutting edges of the drill bit are formed and arranged substantially in the same manner as those as illustrated in FIG. 24. The drill bit comprises a body 400 which has a lubricant hole 401 which extends straightly along and passes through the axis O of rotation. The lubricant hole 401 is opening to the central portion of the forward end face of the body 400. The lubricant hole 401 has an enlarged diameter except the portion 401a which extends by a certain distance through the forward end of the body 400.

All of the embodiments of the present invention as described below are concerned with drill bits which are provided with core removing means in an area where the axis of rotation passes. In the drill bits in accordance with these embodiments of the invention, the distance between the cutting edges and the axis of rotation may be within the range of 0.1 to 1.25 mm or may be larger than 1.25 mm. However the distance between the cutting edge and the axis of rotation should preferably less than 2 mm. If this distance is more than 2 mm, a core formed in a hole being drilled offers substantial resistance to the rotating drill bit so that the drilling operation can not smoothly be carried out.

The embodiments of the present invention as illustrated in FIGS. 62 to 72 are concerned with drill bits which have an inclined or sloping surface as core removing means.

FIGS. 62 to 66 illustrate a solid type drill bit with two cutting edges. This drill bit has a structure similar to that of the drill bit as illustrated in FIG. 20. A part of the bottom of a groove 410 is formed into an inclined surface 411 which slopes relative to the axis of rotation. The inclined surface 411 is located in an area containing the axis O of rotation and its rear end extends to one flute 415. The inclined surface 411 is made flat but it may have other configurations such as a curved one and the like, as far as it is capable of twisting off a cylindrical core 413 as described later. The inclined surface 411 is spaced from cutting edges 412a and 412b by a predetermined distance in the axial direction of the bit body. The aforesaid distance is so determined that the cylindrical core 413 doesn't grow longer than an acceptable length.

During the drilling operation, the cylindrical core 413 is produced at the central portion of the bottom of the drilled hole in a workpiece 416. When the cylindrical core 413 grows longer than the allowable length, it comes into contact with the inclined surface 411 on the bottom of the groove 410. The rotating inclined surface 411 in contact with the cylindrical core 413 twists off the core 413. Thus, the growth of the cylindrical core in excess of the allowable length is suitably prevented. The inclined surface 411 also serves to smoothly direct cuttings at the central portion of the bottom of the drilled hole to another flute 415.

Figure 67:
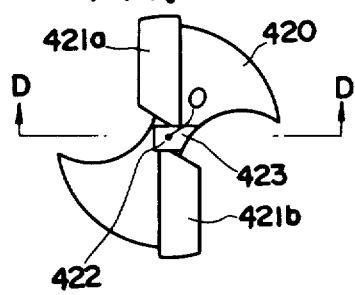
FIG. 67 is an end view of a modified brazing type drill bit with two pieces of cutting edges.
Figure 68:
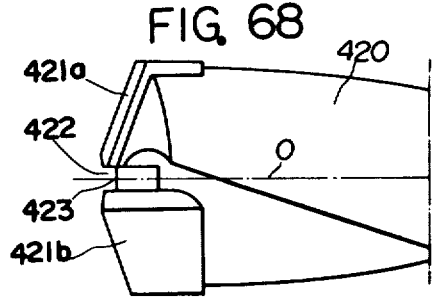
FIG. 68 is a side elevational view of the drill bit of FIG. 67.
Figure 69:
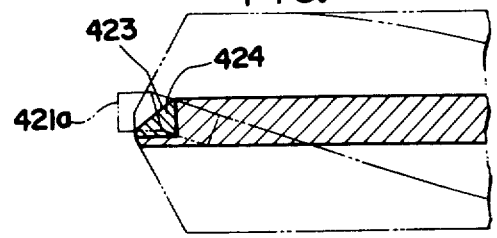
FIG. 69 is a cross-sectional view of the drill bit taken along the line D—D of FIG. 67.

FIGS. 67 to 69 illustrate a brazing type drill bit. The drill bit comprises a body 420 which has cutting means 421a and 421b brazed to its forward end, the cutting means 421a and 421b being spaced from the axis of rotation by a distance of d/2, respectively. A groove 422 is defined by the cutting means 421a and 421b therebetween. At the bottom of the groove 422 is provided an inclined surface 423 in the same manner as described above for the drill bit illustrated in FIGS. 62 to 66. In this embodiment, a member 424 having the inclined surface 423 is made of a super hard alloy such as cemented carbide, the member 424 being separate from the drill bit body 420 and brazed to the forward end of the body 420.

The two embodiments of the invention as described above are concerned with the solid type and brazing type drill bits with two cutting edges, but the features of these drill bits having the inclined surface may be applicable to other types of drill bits such as a drill bit with a single cutting edge, a drill bit with more than three cutting edges and an insert type drill bit.

Figure 70:
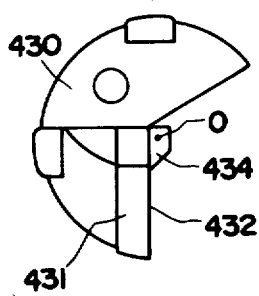
FIG. 70 is an end view of a modified brazing type gun drill bit with a single cutting edge.
Figure 71:
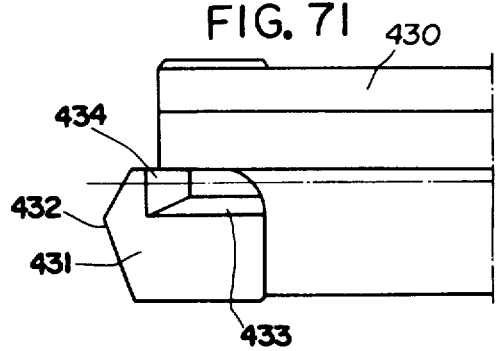
FIG. 71 is a side elevational view of the drill bit of FIG. 70.

FIGS. 70 and 71 illustrate a brazing type gun drill bit with a single cutting edge. The bit body 430 has a cutting member 431 brazed to its forward end. The cutting means 431 has a cutting edge 432 at its forward end and a projection 433 on its side wall. This projection 433 has an inclined surface 434 at its upper end. The inclined surface 434 is located in an area containing the axis O of rotation.

Figure 72:
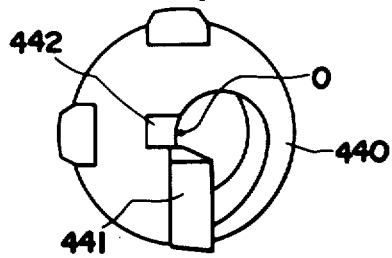
FIG. 72 is an end view of a modified brazing type BTA tool with a single cutting edge.

FIG. 72 illustrates a typical BTA tool. The body 440 of the drill bit has a cutting means 441 brazed to its forward end. At the forward end face of the body 440 is provided an inclined surface 442 adjacent to the cutting means 441. The inclined surface 442 is disposed immediately adjacent to the axis O of rotation. In other words, this inclined surface is formed in the vicinity of the axis of rotation.

Drill bits with a projection serving as core removing means provided in an area containing the axis of rotation will be described with reference to FIGS. 73 to 79.

Figure 73:
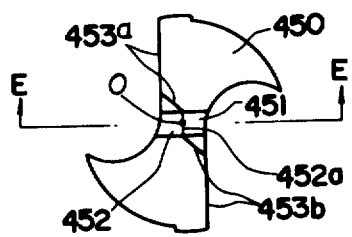
FIG. 73 is an end view of a modified solid type drill bit.
Figure 74:
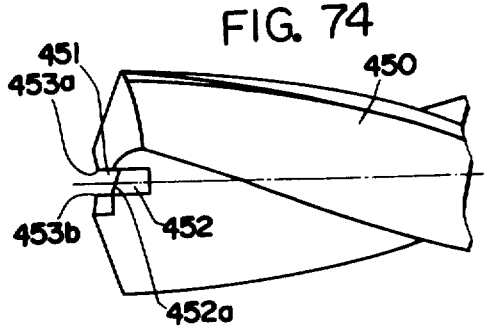
FIG. 74 is a side elevational view of the drill bit of FIG. 73.
Figure 76:
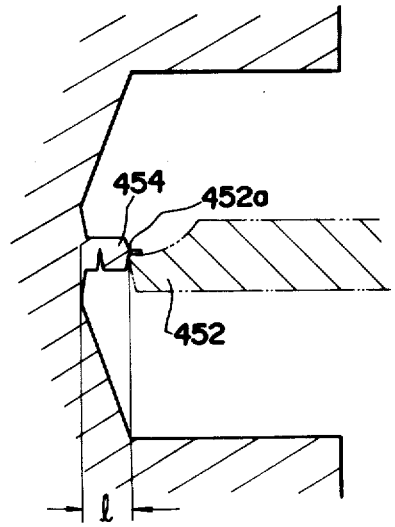
FIG. 76 is a cross-sectional view of a hole drilled by the drill bit of FIGS. 73 to 75.

A solid type drill bit is illustrated in FIGS. 73 and 74 has a structure similar to that of the drill bit as illustrated in FIG. 20. A difference therebetween is that a projection 452 is formed on the bottom of the groove 451 which is formed at the central portion of the forward end of the bit body 450. The tip edge 452a of the projection 452 extends substantially in the radial direction of the bit body and passes through the axis O of rotation or passing in the vicinity of the axis. The tip edge 452a is spaced from cutting edges 453a, 453b by a predetermined distance in the axial direction of the bit body, so that the edge 452a is discrete from the cutting edges 453a, 453b, the cutting edges 453a, 453b being disposed at the forward end of the bit body. Preferably, this distance should be less than the acceptable length for the cylindrical core. When the core 454 grows into a certain length as illustrated in FIG. 76 during the drilling operation with use of the drill bit in this embodiment, the core abuts against the tip edge 452a of the projection 452. The tip edge 452a of the rotating projection 452 is brought into cutting engagement with the tip of the core 454 so that the cylindrical core is twisted off. Thus, the cylindrical core is prevented from growing longer than the acceptable length.

Figure 75:
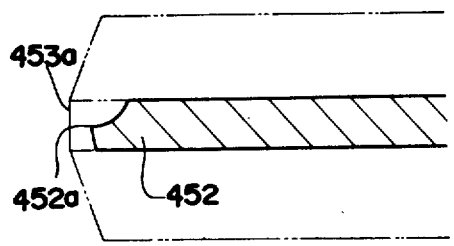
FIG. 75 is a cross-sectional view of the drill bit taken along the line E—E of FIG. 73.
Figure 77:
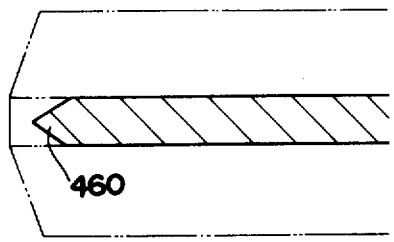
FIG. 77 is a cross-sectional view of a modified drill bit.

In this embodiment, the projection 452 has a generally trapezoidal cross-section as illustrated in FIG. 75, but the projection 452 may have any shape, as far as it is capable of cutting into the cylindrical core to twist off the same. For instance, a projection 460 may have a wedge-shaped cross section as illustrated in FIG. 77.

The feature of the above described projection serving as core removing is applicable not only to the drill bit with two cutting edges but also to any other type of drill bit such as a drill bit with a single or more than three cutting edges, a brazing type drill bit, an insert type drill bit and the like.

Figure 78:
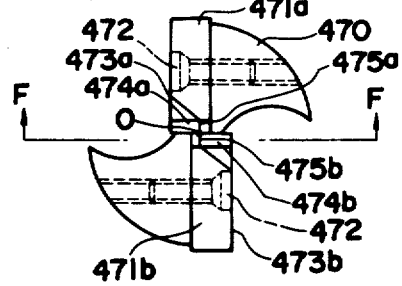
FIG. 78 is an end view of a modified insert type drill bit.
Figure 79:
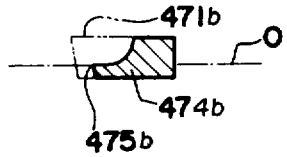
FIG. 79 is a partial cross-sectional view of the drill bit taken along the line F—F of FIG. 78.

Finally, FIGS. 78 and 79 illustrate an insert type drill bit with two cutting edges. The drill bit comprises a body 470 which has inserts 471a and 471b fixedly secured to the forward end thereof by means of clamping bolts 472. The inserts 471a and 471b have cutting edges 473a and 473b at the forward end faces and projections 474a and 474b at the inner end part thereof. The projections 474a and 474b are spaced from the cutting edges 473a and 473b in the axial direction of the bit body. The projections 474a and 474b are arranged in contact with each other at the axis of the drill bit body and disposed symmetrically with respect to the axis O of rotation. The tip edges 475a and 475b of the projections 474a and 474b is in alignment with each other, and the inner end of each tip edge is disposed in the axis O of rotation. The projections may be formed integral with the drill bit body 470 at its forward end face. Alternatively, the projections may be separate members brazed to the body of the drill bit.

What is claimed is:

1. A drill bit for drilling a hole in a metal workpiece which comprises a body having a shank portion and an end face at its forward end and an axis of rotation therethrough, said body having at its forward end a pair of cutting means each having at least one cutting edge, said cutting edges being disposed symmetrically relative to said axis of rotation, each cutting edge having a first and second portion, the said first portion of one of said cutting edges lying on one side of a common diameter and the said first portion of the other cutting edge lying on the opposite side of said common diameter, each said first portion being remote from said axis of rotation and each lying substantially along a straight line, each said second portion extending generally convexly arcuately from one end of said respective first portion to the end of said respective cutting edge, said respective end of said cutting edge being located on the side of said common diameter opposite to the side on which said respective first portion of said respective cutting edge lies, the radially innermost point of said second portions of said cutting edges being equally spaced from said axis of rotation by a distance between 0.1 to 1.25 mm to thereby define a groove having walls between said cutting means, the depth of said groove being not less than 0.2 mm whereby a central core formed in said groove during a drilling operation will be twisted off by the opposed walls of said groove, the opposed walls of said groove extending along said axis of rotation.

2. A drill bit according to claim 1, in which each said cutting edge has a rake surface and each said rake surface comprises a convex surface at least part of which is arcuate.

3. A drill bit according to claim 1, in which said body has a drilling fluid passageway extending along the axis of rotation of said body, said passageway opening to that portion of said end face where said axis of rotation passes.

4. A drill bit according to claim 1 in which said body is of a one-piece construction, part of said body constituting said cutting means.

5. A drill bit according to claim 1, in which said cutting means is secured to said body by brazing.

6. A drill bit according to claim 1, in which said cutting means comprises an insert secured to said body by a clamp means.

7. A drill bit according to claim 1, in which said body has a slit extending radially through the forward end portion of said body to divide the same into two sections, said slit extending along and passing through the axis of rotation of said body, and said body having means adjusting the radial distance between said two sections.

8. A drill bit according to claim 7, in which said adjusting means comprises a screw screwed into one of said two sections and extending into said slit, said screw being engageable with the other of said two sections at its tip end.

9. A drill bit according to claim 7, in which said adjusting means comprises a screw extending through one of said two sections and said slit and screwed into the other of said two sections.

* * * * *